US011795838B2

(12) United States Patent
Jarrossay et al.

(10) Patent No.: US 11,795,838 B2
(45) Date of Patent: Oct. 24, 2023

(54) AIRCRAFT TURBINE SHROUD COOLING DEVICE

(71) Applicant: SAFRAN AIRCRAFT ENGINES, Paris (FR)

(72) Inventors: Clément Jarrossay, Moissy-Cramayel (FR); Antoine Claude Michel Etienne Danis, Moissy-Cramayel (FR); Lucien Henri Jacques Quennehen, Moissy-Cramayel (FR); Nicolas Paul Tableau, Moissy-Cramayel (FR); Sébastien Serge Francis Congratel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 40 days.

(21) Appl. No.: 17/597,320

(22) PCT Filed: Jun. 25, 2020

(86) PCT No.: PCT/FR2020/051108
§ 371 (c)(1),
(2) Date: Jan. 3, 2022

(87) PCT Pub. No.: WO2021/001615
PCT Pub. Date: Jan. 7, 2021

(65) Prior Publication Data
US 2022/0316357 A1    Oct. 6, 2022

(30) Foreign Application Priority Data
Jul. 4, 2019 (FR) .................................. 1907464

(51) Int. Cl.
*F01D 25/14* (2006.01)
*F01D 25/12* (2006.01)
*F01D 25/32* (2006.01)

(52) U.S. Cl.
CPC ............. *F01D 25/14* (2013.01); *F01D 25/12* (2013.01); *F01D 25/32* (2013.01); *F05D 2240/12* (2013.01); *F05D 2260/20* (2013.01)

(58) Field of Classification Search
CPC .......... F01D 25/14; F01D 25/12; F01D 25/32; F01D 25/246; F01D 25/00
See application file for complete search history.

(56) References Cited

U.S. PATENT DOCUMENTS 3,825,364 A * 7/1974 Halila ..................... F01D 11/12
                                                  277/411
4,187,054 A * 2/1980 Landis, Jr. ................ F01D 5/18
                                                  415/115
(Continued)

FOREIGN PATENT DOCUMENTS

EP      2093384 A2    8/2009
EP      3428411 A1    1/2019
(Continued)

OTHER PUBLICATIONS

French Search Report issued in French Application FR1907464 dated Apr. 29, 2020 (2 pages).
(Continued)

*Primary Examiner* — Brian Christopher Delrue
(74) *Attorney, Agent, or Firm* — Bookoff McAndrews, PLLC

(57) ABSTRACT

A device for cooling a turbine shroud comprising at least one annular flange configured to be attached to an annular radial collar of a shroud support structure being arranged upstream, with respect to a circulation direction of an air flow, of the turbine shroud, and comprising at least one cooling air circulation channel, a diffuser configured to be attached to said annular radial collar downstream of the annular flange and comprising at least one intake channel in fluid communication with the circulation channel of the annular flange, (Continued)

and comprising an injection cavity comprising a plurality of injection holes and being configured to inject on a radially external face of the shroud, via the injection holes, the cooling air originating in the intake channel, and a particle filter arranged on an inlet section of the circulation channel of the annular flange, the particle filter comprising a plurality of openings.

13 Claims, 5 Drawing Sheets

(56) References Cited

U.S. PATENT DOCUMENTS

| | | | | |
|---|---|---|---|---|
| 4,573,865 | A * | 3/1986 | Hsia | F01P 1/00 415/173.1 |
| 5,169,287 | A * | 12/1992 | Proctor | F01D 25/12 415/115 |
| 6,726,446 | B2 * | 4/2004 | Arilla | F01D 25/246 415/173.1 |
| 10,427,075 | B2 * | 10/2019 | Jennings | F02C 7/055 |
| 11,391,178 | B2 * | 7/2022 | Metge | F01D 25/12 |
| 2009/0202337 | A1 * | 8/2009 | Bosley | F01D 25/24 415/115 |
| 2012/0171015 | A1 * | 7/2012 | DeLancey | F01D 17/02 415/118 |
| 2013/0192257 | A1 * | 8/2013 | Horine | F01D 25/14 60/796 |
| 2019/0218925 | A1 * | 7/2019 | Garay | F01D 11/08 |

FOREIGN PATENT DOCUMENTS

| | | |
|---|---|---|
| FR | 3040735 A1 | 3/2017 |
| WO | 2019077265 A1 | 4/2019 |

OTHER PUBLICATIONS

International Search Report issued in International Application PCT/FR2020/051108 dated Sep. 15, 2020 with English Translation (4 pages).

* cited by examiner

[Fig. 1]
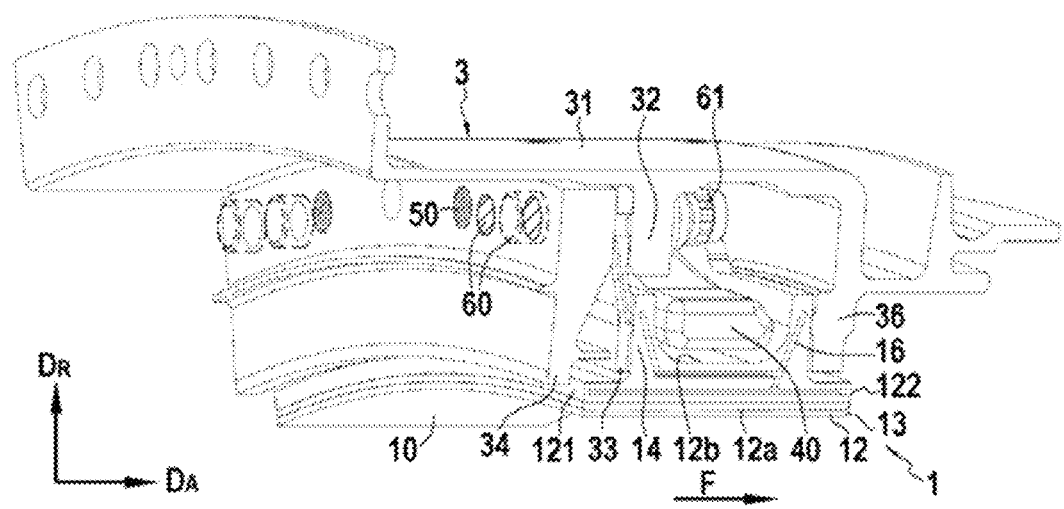
[Fig. 2]
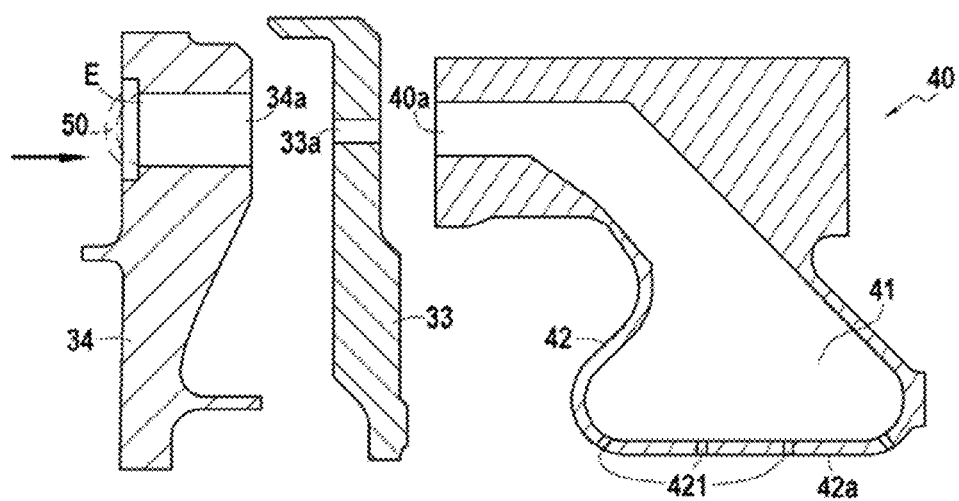

[Fig. 3A]
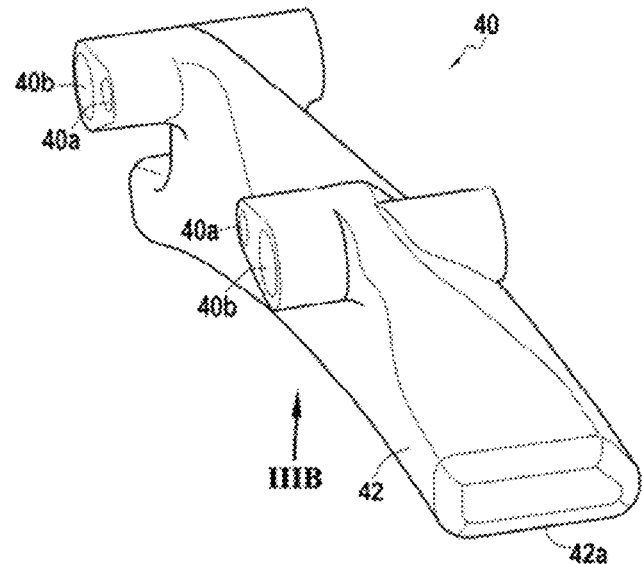
[Fig. 3B]
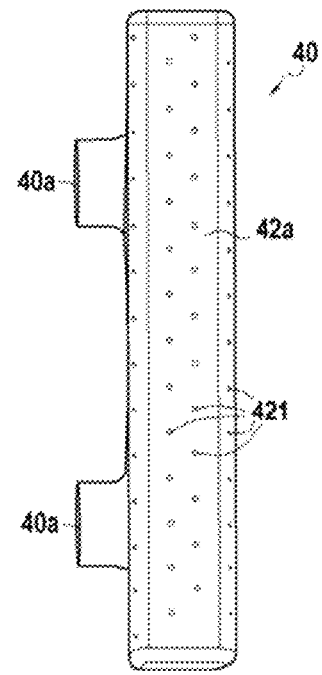

[Fig. 4]
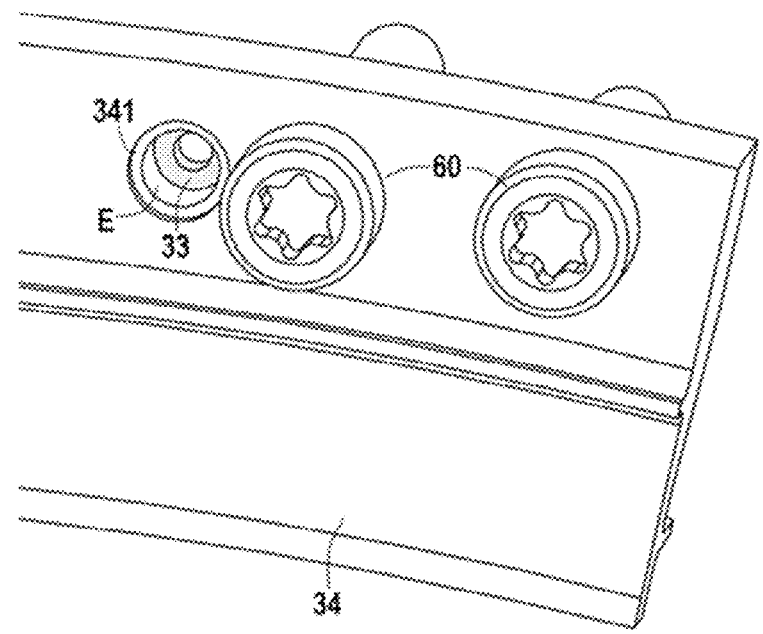
[Fig. 5]
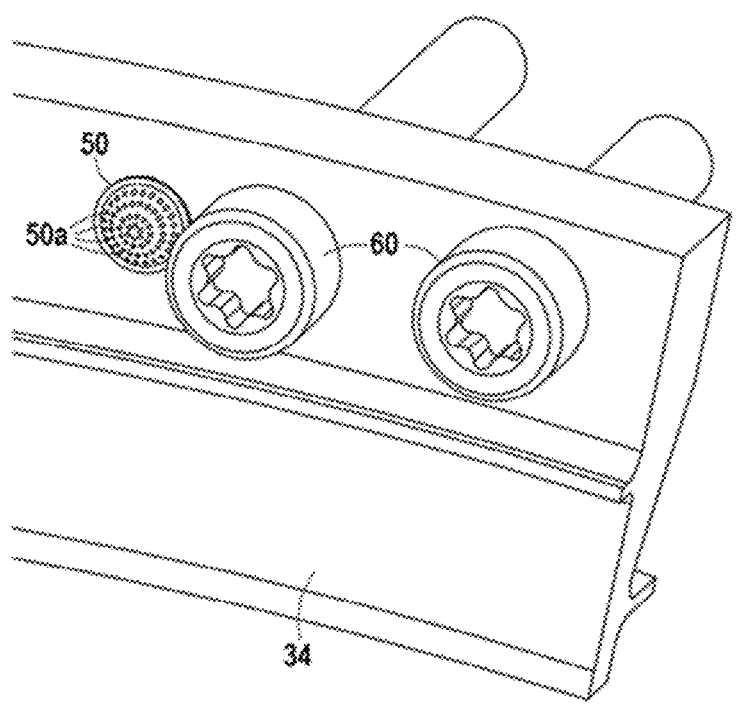

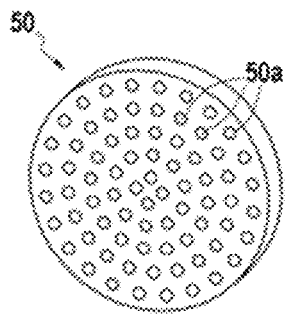
[Fig. 6A]
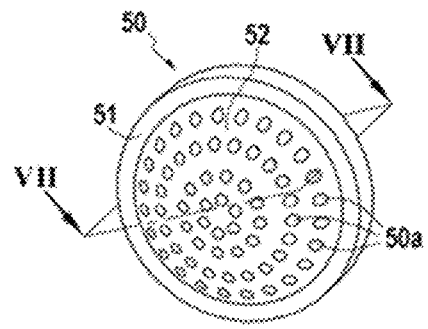
[Fig. 6B]
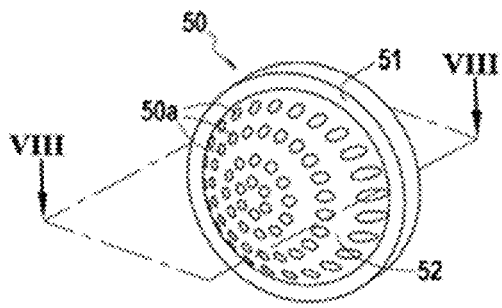
[Fig. 6C]
[Fig. 7]
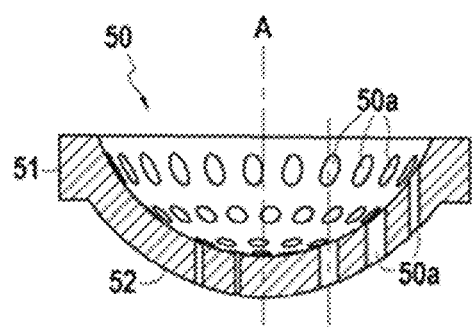

[Fig. 8]
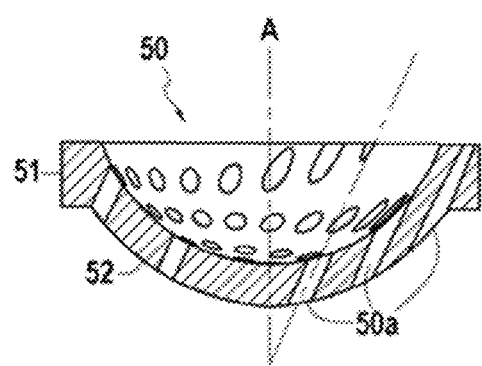

AIRCRAFT TURBINE SHROUD COOLING DEVICE

CROSS-REFERENCE TO RELATED APPLICATIONS

This patent application is the U.S. National Stage entry under 35 U.S.C. § 371 of International Patent Application No. PCT/FR2020/051108, filed on Jun. 25, 2020, which claims the benefit of priority to French Patent Application No. 1907464, filed on Jul. 4, 2019.

TECHNICAL FIELD

The present disclosure relates to the field of turbomachine turbines, particular a cooling device for a turbine shroud sector of ceramic matrix composite material, as well as a turbine comprising a device of this type.

PRIOR ART

In turbomachine turbines, particularly high-pressure turbines, but also low-pressure turbines, comprising entirely metallic elements, it is necessary to cool all the elements, and in particular the shroud of the high- or low-pressure turbine with is subjected to the hottest flows. In particular, this cooling can be carried out by means of a cooling circuit comprising a diffuser allowing the shroud to be cooled and limiting the thermal gradients, by the impact of a jet of cooling air on the radially external wall of this shroud. This injection of cooling air into an external cavity of the hot air flow stream also allows pressurizing this cavity, thus limiting the risk of reintroduction of hot air originating in the stream.

This cooling has a significant impact on the performance of the engine because the cooling flow used is extracted from the main flow of the engine, for example in a stage of the high-pressure compressor. In addition, the use of metal for the turbine shroud limits the possibilities of increasing temperature at the turbine, and therefore limits the possibilities of improving the performance of the engine.

In order to attempt to solve these problems, it has been contemplated to makes turbine shroud sectors of ceramic matrix composite (CMC) material preplacing the use of a metallic material. CMC materials have good mechanical properties making them able to constitute elements of structures and advantageously retain their properties at high temperatures. The implementation of CMC material has advantageously allowed reducing the cooling flow during operation and therefore increasing the performance of turbomachines. In addition, the use of CMC materials advantageously allows reducing the mass of the turbomachines and reducing the effect of hot dilation encountered with metallic parts.

In order to nevertheless retain sufficient cooling of the CMC shroud, while limiting the necessary quantity of cooling air, the diameter of the injection holes, present in the diffuser and allowing cooling air to be injected by impact of a jet of air on the wall of the shroud, can be reduced. The reduction of this diameter allows, at a given flow rate, increasing the speed of impact of the air on the shroud and thus improving the effectiveness of the heat exchange and therefore of the cooling of the CMC shroud.

However, the fact of having injection holes of smaller diameter increases the risk of obstruction of these holes by particles such as grains of sand. In such a situation of obstruction of the injection holes, the shroud of CMC could not be sufficiently cooled. The cavity external to the air flow stream could additionally no longer be sufficiently pressurized, consequently increasing the risk of reintroduction of hot air originating in said stream, and the risk of high thermal stresses. These phenomena could cause a degradation of the shroud, of the turbine and, by extension, of the engine.

In this context, there exists therefore a need for a device allowing an improvement in the cooling of turbine parts subjected to large temperature gradients, such as high-pressure or low-pressure turbine shrouds, without reducing the performance of the engine.

DISCLOSURE OF THE INVENTION

In order to solve at least in part the disadvantages mentioned above, the present disclosure relates to a device for cooling a turbine shroud, comprising:
- at least one annular flange configured to be attached to an annular radial collar of a shroud support structure being arranged upstream, relative to a circulation direction of an air flow, of the turbine shroud, and comprising at least one cooling air circulation channel,
- a diffuser configured to be attached to said annular radial collar downstream of the annular flange and comprising at least one intake channel in fluid communication with the circulation channel of the annular flange, and comprising an injection cavity comprising a plurality of injection holes and being configured to inject cooling air originating in the intake channel on a radially external face of the shroud, via the injection holes,
- a particle filter arranged on an inlet section of the circulation channel of the annular flange, the particle filter comprising a plurality of openings, the diameter of these openings being less than the diameter of the injection holes of the diffuser.

In the present disclosure, the terms "upstream" and "downstream" are defined with respect to the circulation direction of the air flow within the turbine, this air flow being in particular a flow of hot air flowing in the air stream delimited by the radially internal face of the turbine shroud, inside which the blading of the rotor is arranged. Moreover, the terms "radially internal" and "radially external" are defined with respect to the radial direction of the shroud, perpendicular to the central axis of the shroud.

The turbine shroud can comprise a plurality of shroud sectors, preferably comprising a ceramic matrix composite (CMC), and assembled to one another so as to form the turbine shroud. The annular flange is a distinct part of the shroud, attached to an annular radial collar of a shroud support structure, this structure serving for its part to support the shroud. More precisely, the annular flange is an upstream flange dedicated to taking up the force of the high-pressure nozzle (DHP). The annular flange upstream of the turbine shroud is free of all contact with the shroud and configured to cause a maximum of axial force induced by the DHP to transit directly into the shroud support structure without passing through the CMC shroud.

The cooling air can be extracted upstream of the turbine, for example at the back of the combustion chamber, in particular a cavity bypassing the chamber, in a region where the air is colder than the air flowing in the hot air flow stream, defined by the radially internal wall of the turbine shroud. This cooling air is then routed to the inlet section of the circulation channel of the flanges, by means, for example, of a conduit extending between the extraction region and said inlet section, arranged at the upstream end of said flange. In particular, the strong air pressure in this bypass cavity allows the air to be put into circulation in the conduit and to route it to the inlet section of the flange.

What is meant by "in fluid communication" is that cooling air entering by the inlet section of the circulation channel of the annular flange flows along the circulation channel of the flange, then along the inlet channel of the diffuser, to the injection holes. It is also understood that the injection cavity of the diffuser includes a wall including the injection holes, this wall facing the radially external face of the shroud, so that the air present in the injection cavity of the diffuser can be injected on the radially external face of the shroud. The impact of the cooling air on said radially external face thus allows limiting the increase in temperature of the shroud, caused by the hot air circulating in the hot air stream along the radially internal face of the shroud.

The presence of the particle filter on the inlet section of the flange permits, on the one hand, due to the presence of the openings, allowing the cooling air to penetrate into the circulation channel of the annular flange and to be routed to the injection holes. On the other hand, taking into account the fact that the openings of the particle filter have a smaller diameter than the diameter of the injection holes, particles can be blocked by the particle filter before the can reach the diffuser, thus preventing these particles from obstructing the injection holes. The fact that this filter is arranged on a flange upstream of the shroud allows facilitating maintenance operations, during which the filters are cleaned, their arrangement being more accessible than the injection holes situated inside the diffuser. This air filtering can also be accomplished without it being necessary to modify the shroud support structure or the CMC shroud to integrate the filtering function, which allows avoiding modifying these parts with a complex geometry and with high stresses.

In certain embodiments, the device comprises a cooling circuit, the cooling circuit comprising the inlet section, the circulation channel, the intake channel and the injection cavity, said circuit having a variable cross section and comprising a section for calibrating the flow rate of cooling air, the calibration section being a section of minimum diameter of the cooling circuit.

At a given flow speed of the cooling air, the flow rate of cooling air is determined by the passage cross section of the channel in which this cooling air flows. Consequently, the passage cross section of the cooling circuit being variable, the flow rate is therefore calibrated by the cross section of the circuit having the smallest value. The presence of the calibration section, by the selection of the value of the minimum diameter section, thus allows setting a desired flow rate, depending on the cooling needs of the turbine shroud.

In certain embodiments, a total passage cross section of all the openings of the particle filter is between 1.5 and 5 times greater than the calibration section.

What is meant by "total passage cross section" is the sum of the passage cross sections of each opening of the particle filter. It is thus possible to have a total passage cross section through the filter which is sufficiently greater than the calibration section, and to the total cross section of the injection holes of the diffuser, so as not to restrain the cooling flow rate of the shroud, while having openings in the filter of a diameter slightly less than that of the injection holes of the diffuser. Thus, between two cleanings of the particle filter, a sufficient flow rate of cooling air can be retained, even if certain openings of the particle filter are obstructed. These particles caught in the filter can be eliminated during engine cleanings.

In certain embodiments, the annular flange is a first flange, and the circulation channel is a first channel, the device also comprising at least one second annular flange configured to be attached to the first flange and to an upstream radial fastening collar of the shroud being interleaved between said first flange and said radial fastening collar, the second annular flange comprising a second circulation channel for cooling fluid in fluid communication with the first channel and the intake channel of the diffuser.

In other words, the cooling circuit comprises the inlet section, the first circulation channel of the first flange, the second circulation channel of the second flange, the intake channel of the diffuser, then the injection cavity. Preferably, the second flange is also attached to the annular radial collar of the shroud support structure, being interleaved between the first flange and said collar. Thus, the second flange is attached both to the annular radial collar of the shroud support structure and to the upstream radial fastening collar of the shroud. The second annular flange allows in particular ensuring the axial sealing between the sectorized turbine shroud of CMC and the annular casing of the support structure.

In certain embodiments, the diameter of the second circulation channel is less than the diameter of the first circulation channel and defines the calibration section.

In other words, the first circulation channel of the first flange, having a greater diameter, serves as a dispensing opening allowing treating a maximum of upstream particles by means of the particle filter. Conversely, the second circulation channel of the second flange, having a smaller diameter, serves as a calibration opening, allowing calibrating the flow rate of cooling air injected downstream via the injection holes of the diffuser. The calibration and filtration functions are thus performed by distinct parts of the shroud and of the shroud support structure, without having to modify the shroud support structure or the shroud.

In certain embodiments, the length of the second channel is smaller than the length of the first channel. In other words, the length of the calibrating hole is smaller than the length of the dispensing hole. This allows limiting the head losses which are produced in the second circulation channel, defining the flow rate.

In certain embodiments, the filter is welded or brazed on the inlet section of the circulation channel.

In certain embodiments, the filter has a round shape.

The cooling fluid flow channels preferably having a circular cross section, the use of a filter having a round shape similar to that of the channels facilitates the manufacture of this filter.

In certain embodiments, the filter comprises an attachment portion attached to the annular flange around the inlet section, and a filtering portion comprising the plurality of openings.

Preferably, the attachment portion does not include an opening. The attachment portion allows ensuring the retention of the filter against the upstream wall of the annular flange, of first annular flange in particular. In other words, the attachment portion is attached, by being welded or brazed, to the upstream wall of the flange, the attachment surface between the attachment portion and the flange surrounding the inlet section so that the filtering portion comprising the openings is facing said inlet portion. This allows improving the effectiveness of the particle filter.

In certain embodiments, the attachment portion has a planar shape, and the filtering portion has a convex shape, the convexity being directed toward the outside of the circulation channel.

The planar surface of the attachment portion allows increasing the contact surface between said attachment portion and the wall of the flange, thus improving the retention of the filter against the flange. Moreover, the convex, or domed shape of the filtering portion of the filter allows limiting the risk that particles will be pressed against the filter and remain locked in its openings. In fact, the inclination of the surface of the filter, particularly of the filtering portion, allows sliding the particles along this surface, then along the flange.

In certain embodiments, the axis of the openings of the filter is inclined relative to a central axis of the filter.

When the filter has a circular shape, the central axis of the filter is the axis passing through the center of the circle. When the axis is attached to the inlet section, the central axis of the filter is coaxial with the central axis of the first circulation channel. Preferably, the axis of the openings is inclined so as to have a direction opposite to the direction of gyration of the air flow in this zone of the engine. This allows limiting the risk that the openings of this filter become clogged.

In certain embodiments, the injection holes of the diffuser have a diameter less than 1 mm.

The injection holes can for example have a diameter equal to 0.5 mm. These values allow obtaining a high impact speed of the air on the radially external wall of the shroud, thus increasing heat exchange and therefore the effectiveness of cooling of the CMC shroud.

The present disclosure also relates to an assembly comprising a turbine shroud extending around a central axis, a shroud support structure, and a cooling device according to any of the preceding embodiments, the turbine shroud comprising an annular base having a radially internal face, defining an air flow stream, a radially external face and two radial fastening collars arranged at the upstream and downstream ends, along the central axis, of the annular base.

The turbine ring is preferably of CMC.

The present disclosure also relates to a turbine comprising the assembly according to the present disclosure, the turbine being able to be a high-pressure or low-pressure turbine.

The present disclosure also relates to a turbomachine comprising the turbine according to the present disclosure.

BRIEF DESCRIPTION OF THE DRAWINGS

The invention and its advantages will be better understood upon reading the detailed description given below of different embodiments of the invention given by way of non-limiting examples. This description refers to the appended pages of figures, in which:

FIG. 1 is a perspective view of a turbine shroud assembly according to the present disclosure;

FIG. 2 shows an exploded section view of a cooling device for a turbine shroud according to the present disclosure;

FIG. 3A shows a perspective view of a diffuser, and FIG. 3B shows a view of the diffuser of FIG. 3A in the direction IIIB;

FIG. 4 shows an enlarged perspective view of the shroud assembly of FIG. 1, of the first annular flange in particular, without a particle filter;

FIG. 5 shows an enlarged perspective view of the shroud assembly of FIG. 1, of the first annular flange in particular, with a particle filter;

FIG. 6A shows a perspective view of a particle filter according to a first embodiment, FIG. 6B shows a perspective view of a particle filter according to a second embodiment, FIG. 6C shows a perspective view of a particle filter according to a third embodiment;

FIG. 7 shows a section view, along section plane VII-VII, of the particle filter of FIG. 6B;

FIG. 8 shows a section view, along section plane VIII-VIII, of the particle filter of FIG. 6C.

DESCRIPTION OF THE EMBODIMENTS

The remainder of the description refers to a high-pressure turbine. Nevertheless, this example is not limiting, the invention being able in particular to apply to a low-pressure turbine. FIG. 1 shows a shroud assembly of a high-pressure turbine comprising a turbine shroud 1 of ceramic matrix composite (CMC) material and a metal shroud support structure 3. The turbine shroud 1 surrounds a set of rotating blades (not shown). The turbine shroud 1 is formed of a plurality of shroud sectors 10, of which only 1 is visible in FIG. 1. The arrow DA indicates the axial direction of the turbine shroud 1 while the arrow $D_R$ indicates the radial direction of the turbine shroud 1. For the sake of simplifying the presentation, FIG. 1 is a partial view of the turbine shroud 1 which in reality is a complete shroud.

Each shroud sector 10 has, along a plane defined by the axial DA and radial $D_R$ directions, a cross section substantially in the shape of the inverted Greek letter π. The cross section comprises in fact an annular base 12 and collars, or upstream and downstream annular radial fastening tabs, respectively 14 and 16. The terms "upstream" and "downstream" are used here with reference to the direction of flow of the gas flow in the turbine represented by the arrow F in FIG. 1. The tabs of the shroud sector could have another shape, the shape of the shroud sector having a shape other than t, such as for example a K or an O shape.

The annular base 12 includes, in the radial direction $D_R$ of the shroud 1, an inner face 12a and an outer face 12b opposite to one another. The inner face 12a of the annular base 12 is covered with a layer 13 of abradable material to define a flow stream of the gas flow in the turbine. The terms "inner" and "outer" are used here with reference to the radial direction $D_R$ in the turbine.

The upstream and downstream radial fastening collars 14 and 15 protrude, in the direction $D_R$, from the outer face 12b of the annular base 12 at a distance from the upstream and downstream ends 121 and 122 of the annular base 12. The upstream and downstream radial fastening collars 14 and 16 extend over the entire width of the shroud sector 10, i.e. over the entire circular arc described by the shroud sector 10, or even over the circumferential length of the shroud sector.

As illustrated in FIG. 1, the shroud support structure 3, which is integral with a turbine casing, comprises a central shell 31, extending in the axial direction DA, and having an axis of revolution congruent with the axis of revolution of the turbine shroud 1 when they are attached together, as well as a first annular radial collar 32 and a second annular radial collar 36, the first annular radial collar 32 being positioned upstream of the second annular radial collar 36.

The second annular radial collar 36 extends in the circumferential direction of the shroud 1 and, following the radial direction $D_R$, from the central shell 31 to the center of the shroud 1. The second annular radial collar 36 is in contact with the downstream radial fastening collar 16 and is attached to it.

The first annular radial collar 32 extends in the circumferential direction of the shroud 1 and, following the radial direction $D_R$, from the central shell 31 of the center of the shroud 1.

The turbine shroud 1 comprises a first annular flange 34 and a second annular flange 33, the two annular flanges 33 and 34 being removably attached to the first annular radial collar 32. The first and second annular flanges 33 and 34 are arranged upstream of the turbine shroud 1 with respect to the direction of flow F of the gas flow in the turbine.

The second annular flange 33 is arranged downstream of the first annular flange 34. The first annular flange 34 and the second annular flange 33 can be sectorized into a plurality of shroud sectors or be in a single piece.

A portion of the second flange 33 is supported on the radial fastening collar 14 of the shroud sector 10 and attached to this collar. The two flanges 33 and 34 are removably attached to the annular radial collar 32 by means of attachment screws 60 and nuts 61, the screws passing through openings provided respectively in the two upstream flanges 33 and 34 as well as in the annular radial collar 32.

The first annular flange 34 allows taking up the force of the high-pressure nozzle (DHP) on the shroud assembly by having this force transit toward the casing line which is mechanically more robust, i.e. toward the line of the shroud support structure 3.

The outer face 12b and the collars 14, 16 form a cavity outside the stream, in other words a cavity external to the hot air flow stream F. Due to the presence of air at a high temperature on the stream side, the wall 12 is subjected to high thermal gradients. Moreover, the high pressures in the hot air flow stream F increase the risk of leakage of hot air, particularly at the junctions between the shroud sectors 10. The injection of cooling air into the cavity outside the stream thus allows cooling the wall 12 of the shroud and reducing its thermal gradients, and also increasing the pressure in the cavity outside the stream, thus limiting the risk of leakage of hot air F flowing in the stream.

To accomplish this, the assembly comprises a cooling device, itself comprising in particular the first and second flanges 33, 34 and a diffuser 40 arranged in the cavity outside the stream. In particular, besides the openings allowing the attachment of the flanges 33, 34 and the passage of screws 60, the flanges 33, 34 also comprise openings defining a cooling air flow channel.

More precisely, the first annular flange 34 comprises a first circulation channel 34a, and the second annular flange 33 comprises a second circulation channel 33a. The first and the second channel 34a, 33a are coaxial with one another. Preferably, the diameter of the second channel 33a is less than the diameter of the first channel 34a.

The diffuser 40 comprises an intake channel 40a in fluid communication with an injection cavity 41. FIG. 3A shows a perspective view of a diffuser 40. In this example, the diffuser 40 comprises two attachment openings 40b, allowing attaching the diffuser 40 to the upstream annular radial collar 32, by means of screws 60 also serving for the attachment of the flanges 33, 34 or directly to the second flange 33, passing through a passage formed in the annular radial collar 32 along the circumference of the shroud support 3. In this example, the diffuser 40 comprises two intake channels 40a, each coaxial with a second channel 33a of the second flange 33 and in fluid communication with it. The injection cavity 41 is delimited by an envelope 42 with a substantially curved shape in the circumferential direction, so as to conform to the shape of the outer face 12b of the shroud 12. More precisely, a wall 42a, arranged below the diffuser 40 in the radial direction, is facing the outer face 12b and extends circumferentially, substantially parallel to this outer face 12b.

FIG. 3B shows a view from below of the diffuser 40 of FIG. 3A. The wall 42a includes a plurality of injection holes 421. In this example, these injection holes 421 have a diameter comprised between 0.1 and 1 mm, for example 0.5 mm. The air present in the injection cavity 41 is thus injected by impact of the air jet against the outer face 12b, by means of these injection holes 421.

More precisely, the cooling air is extracted upstream in the engine, for example at the back of the combustion chamber, and is routed to the inlet section E of the first channel(s) 34a (see arrow in FIG. 2). It then flows along the first channel(s) 34a, along the second channel(s) 33a, along the intake channel(s) 40a, then into the injection cavity 41 of the diffuser 40. The pressure existing in the injection cavity 41 then allows the injection of cooling air by means of the injection holes 421.

FIG. 4 shows an enlarged view of the inlet section E of a first circulation channel 34a of the first flange 34. FIG. 4 shows a configuration in which the inlet section E does not comprise a filter. For the sake of simplification, only the first flange 34 and a portion of the second flange 33 visible through the first circulation channel 34a are shown, the other elements of the assembly being obscured. The upstream face of the first flange 34 also includes a shoulder 341 around the inlet section E, and delimiting it.

FIG. 5 shows a configuration in which a particle filter 50 is arranged on the inlet section E. More precisely, the particle filter 50 can be a circular plate with a diameter that allows it to be inserted into the shoulder 341, and attached by being welded or brazed on the upstream face of the first flange 34, being inserted into said shoulder 341.

Moreover, the particle filter 50 comprises a plurality of openings 50a. The number and the cross section of these openings are determined so as to control a flow rate of air allowing cooling of the outer face 12b, by preventing the particles whose dimensions are greater than the diameter of the injection holes 421 from penetrating into the first channel 34a, and therefore be routed to the injection cavity 41. More precisely, the flow rate of cooling air passing through the calibration section of the flow, i.e. the cross section of the second circulation channel 33a, must remain controlled between two maintenance operations of the device during which the filter is cleaned.

FIG. 6A shows a first embodiment in which the filter 50 is flat. FIG. 6B shows a second embodiment of the particle filter 50 of the present disclosure. In this second embodiment, the filter 50 comprises an attachment portion 51 with a flat shape, allowing attaching the filter 50 on the upstream face of the first flange 34, particularly at the back of the shoulder 341. The filter 50 also comprises a filtration portion 52 comprising the openings 50a. The filtration portion 52 has a convex or domed shape, allowing limiting the risk that the particles will be pressed against the filter 50 by favoring the sliding of the particles along this domed surface, then along the first flange 34. FIG. 7 shows a section view of the particle filter 50 of this second embodiment. According to this embodiment, the axis of the openings 50a is substantially parallel to the central axis A of the filter 50, in other words to the axis of the first channel 34a.

FIG. 6C shows a third embodiment of the particle filter 50 of the present disclosure. The filter 50 of this third embodiment is similar to the filter 50a of the second embodiment, but differs from the latter in that the axis of the openings 50a is inclined relative to the central axis A of the filter 50, as can be seen in FIG. 8. Preferably, the axis of the openings 50a is oriented in a direction opposite to the gyration of the air in this zone of the engine, so as to limit the obstruction of the openings 50a. Alternatively, this third embodiment can be combined with the features of the first embodiment. In other words, the filter 50 can have a flat shape, the openings 50a being inclined relative to the central axis A.

Although the present invention has been described by referring to specific exemplary embodiments, it is obvious that modifications and changes can be performed on these examples without departing from the general scope of the invention as defined by the claims. In particular individual features of the different embodiments illustrated/mentioned can be combined into additional embodiments. Consequently, the description and the drawing can be considered in an illustrative, rather than a restrictive sense.

The invention claimed is:

1. A device for cooling a turbine shroud comprising:
at least one annular flange configured to be attached to an annular radial collar of a shroud support structure being arranged upstream of the turbine shroud and comprising at least one cooling air circulation channel,
a diffuser configured to be attached to said annular radial collar downstream of the annular flange and comprising at least one intake channel in fluid communication with the circulation channel of the annular flange, and comprising an injection cavity comprising a plurality of injection holes and being configured to inject cooling air originating in the intake channel on a radially external face of the shroud, via the injection holes,
a particle filter arranged on an inlet section of the circulation channel of the annular flange, the particle filter comprising a plurality of openings, the diameter of these openings being less than the diameter of the injection holes of the diffuser, the at least one annular flange, the diffuser and the shroud support structure being separate structures.

2. The device according to claim 1, comprising a cooling circuit, the cooling circuit comprising the inlet section, the circulation channel, the intake channel and the injection cavity, said circuit having a variable cross section and comprising a calibration section of the flow rate of cooling air, the calibration section being a section of minimum diameter of the cooling circuit.

3. The device according to claim 1, wherein a total passage cross section of all the openings of the particle filter is between 1.5 and 5 times greater than the calibration section.

4. The device according to claim 1, wherein the annular flange is a first flange, and the circulation channel is a first channel, the device also comprising at least one second annular flange configured to be attached to the first flange and to an upstream radial fastening collar of the shroud being interleaved between said first flange and said upstream radial fastening collar, the second annular flange comprising a second circulation channel for cooling fluid in fluid communication with the first channel and the intake channel of the diffuser.

5. The device according to claim 4, wherein the diameter of the second circulation channel is less than the diameter of the first circulation channel and defines the calibration section.

6. The device according to claim 1, wherein the particle filter has a round shape.

7. The device according to claim 1, wherein the particle filter comprises an attachment portion attached to the annular flange around the inlet section, and a filtering portion comprising the plurality of openings.

8. The device according to claim 7, wherein the attachment portion has a planar shape, and the filtering portion has a convex shape, the convexity being directed toward the outside of the circulation channel.

9. The device according to claim 1, wherein the axis of the openings of the filter is inclined relative to a central axis of the filter.

10. An assembly comprising a turbine shroud extending around a central axis, a shroud support structure and a cooling device according to claim 1, the turbine shroud comprising an annular base having a radially internal face, defining an air flow stream, a radially external face and two radial fastening collars arranged at the upstream and downstream ends, along the central axis, of the annular base.

11. A turbine comprising the assembly according to claim 10.

12. A device for cooling a turbine shroud comprising:
at least one annular flange configured to be attached to an annular radial collar of a shroud support structure being arranged upstream of the turbine shroud and comprising at least one cooling air circulation channel,
a diffuser configured to be attached to said annular radial collar downstream of the annular flange and comprising at least one intake channel in fluid communication with the circulation channel of the annular flange, and comprising an injection cavity comprising a plurality of injection holes and being configured to inject cooling air originating in the intake channel on a radially external face of the shroud, via the injection holes,
a particle filter arranged on an inlet section of the circulation channel of the annular flange, the particle filter comprising a plurality of openings, the diameter of these openings being less than the diameter of the injection holes of the diffuser,
wherein the annular flange is a first flange, and the circulation channel is a first channel, the device also comprising at least one second annular flange configured to be attached to the first flange and to an upstream radial fastening collar of the shroud being interleaved between said first flange and said upstream radial fastening collar, the second annular flange comprising a second circulation channel for cooling fluid in fluid communication with the first channel and the intake channel of the diffuser.

13. The device according to claim 12, wherein the diameter of the second circulation channel is less than the diameter of the first circulation channel and defines the calibration section.

* * * * *